US011655033B2

(12) United States Patent
Bosstick

(10) Patent No.: US 11,655,033 B2
(45) Date of Patent: May 23, 2023

(54) INFLATABLE BED WITH SAFETY ADAPTATIONS FOR RAPID LOSS OF AIRCRAFT CABIN PRESSURE

(71) Applicant: JetBed, Inc., San Diego, CA (US)

(72) Inventor: Gerald Bosstick, Rancho Santa Fe, CA (US)

(73) Assignee: JetBed, Inc., San Diego, CA (US)

( * ) Notice: Subject to any disclaimer, the term of this patent is extended or adjusted under 35 U.S.C. 154(b) by 185 days.

(21) Appl. No.: 17/180,322

(22) Filed: Feb. 19, 2021

(65) Prior Publication Data
US 2021/0261256 A1  Aug. 26, 2021

Related U.S. Application Data

(60) Provisional application No. 62/979,321, filed on Feb. 20, 2020.

(51) Int. Cl.
| B64D 11/00 | (2006.01) |
| A47C 27/08 | (2006.01) |
| B64D 11/06 | (2006.01) |

(52) U.S. Cl.
CPC ............ *B64D 11/00* (2013.01); *A47C 27/081* (2013.01); *B64D 11/0604* (2014.12); *B64D 2011/0069* (2013.01); *B64D 2011/0076* (2013.01)

(58) Field of Classification Search
CPC .... B64D 2011/0069; B64D 2011/0076; B64D 11/0604; B64D 11/0602; B64D 11/06; B64D 11/0605; B64D 11/00; A47C 27/08; A47C 27/081; A47C 4/54; A47C 27/082; A47C 27/10
See application file for complete search history.

(56) References Cited

U.S. PATENT DOCUMENTS

| 35,373 | A | 5/1862 | Guernsey |
| 44,634 | A | 10/1864 | Jury |
| 47,703 | A | 5/1865 | Crellin |
| 53,568 | A | 4/1866 | Bush |
| 54,964 | A | 5/1866 | Saul |
| 96,598 | A | 11/1869 | Kenyon |
| 102,751 | A | 5/1870 | Bartlett et al. |
| 102,975 | A | 5/1870 | Sercombe |
| 180,382 | A | 7/1876 | Sitzler |
| 197,720 | A | 12/1877 | Clark |
| 217,351 | A | 7/1879 | Du Brul |
| 229,298 | A | 6/1880 | Anders et al. |
| 367,422 | A | 8/1887 | Mellett |

(Continued)

FOREIGN PATENT DOCUMENTS

| DE | 2526473 A | 12/1976 |
| DE | 3637648 A1 | 5/1987 |

*Primary Examiner* — David R Hare
*Assistant Examiner* — Deborah Talitha Gedeon

(57) ABSTRACT

The present invention generally relates to bed structures having an inflatable and/or collapsible/deflatable component. More particularly, it relates to bed construction configurations that can include multiple adaptations for enhanced safety in situations of rapid loss of aircraft cabin pressure to meet airflow requirements for emergency decompression events as well as to provide overall better airflow for in-cabin air filtration systems. The bed configurations can include cross-welded structures and bowing-prevention stabilizers to control bulging of the bed when inflated.

9 Claims, 8 Drawing Sheets

(56) References Cited

U.S. PATENT DOCUMENTS

| | | | |
|---|---|---|---|
| 535,365 A | 3/1895 | Fadner |
| 691,118 A | 1/1902 | Curlin |
| 988,513 A | 4/1911 | Shea et al. |
| 995,234 A | 6/1911 | Emerson |
| 1,983,119 A | 12/1934 | Boyd |
| 2,023,173 A | 12/1935 | Hiener |
| 2,163,198 A | 6/1939 | Gossard |
| 2,177,174 A | 10/1939 | Eccles |
| 2,348,407 A | 5/1944 | O'Neill |
| 2,372,218 A | 3/1945 | Manson |
| 2,504,645 A | 4/1950 | Burnett |
| 2,648,072 A | 8/1953 | De Blieux |
| 2,676,337 A | 4/1954 | Soeder |
| 2,796,111 A | 6/1957 | Janczyszyn |
| 3,058,769 A | 10/1962 | Willson |
| 3,097,876 A | 7/1963 | Willson |
| 3,143,746 A | 8/1964 | Spear |
| 3,193,324 A | 7/1965 | Stock |
| 3,265,438 A | 8/1966 | Regan |
| 3,420,574 A | 1/1969 | Smith |
| 3,513,489 A | 5/1970 | Miller |
| 3,570,024 A | 3/1971 | Griffin |
| 3,600,725 A | 8/1971 | McCartney |
| 3,648,306 A | 3/1972 | Auerbach |
| 3,696,449 A | 10/1972 | Smith |
| D228,050 S | 8/1973 | Weiland |
| 3,833,947 A | 9/1974 | Sorenson |
| 3,910,630 A | 10/1975 | Runyon |
| 3,959,835 A * | 6/1976 | Nos ................ A47C 27/081 5/706 |
| 3,978,530 A | 9/1976 | Amarantos |
| 4,003,098 A | 1/1977 | Fink |
| 4,040,655 A | 8/1977 | Garrick |
| 4,085,962 A | 4/1978 | Wahls |
| 4,131,313 A | 12/1978 | Jacobs |
| 4,262,045 A | 4/1981 | Cheng |
| 4,299,233 A | 11/1981 | Lemelson |
| 4,346,132 A | 8/1982 | Cheng |
| 4,745,648 A | 5/1988 | Viesturs |
| 4,943,105 A | 7/1990 | Kacar |
| D314,804 S | 2/1991 | Thomas |
| D315,187 S | 3/1991 | Thomas |
| 5,005,702 A | 4/1991 | Davis |
| 5,181,286 A | 1/1993 | McNulty |
| 5,185,896 A | 2/1993 | Bonda |
| 5,333,336 A | 8/1994 | Langsam |
| 5,544,373 A | 8/1996 | Chang |
| 5,639,141 A | 6/1997 | Hanemaayer |
| 5,816,645 A | 10/1998 | Grimes |
| D405,291 S | 2/1999 | Yu |
| 5,960,497 A | 10/1999 | Castellino |
| 5,966,755 A | 10/1999 | Pittman |
| 6,006,383 A | 12/1999 | Pile |
| D419,495 S | 1/2000 | Muhanna |
| 6,015,186 A | 1/2000 | Grieger |
| D420,238 S | 2/2000 | Jefferson |
| 6,170,786 B1 | 1/2001 | Park |
| D444,550 S | 7/2001 | Cobbs |
| 6,428,083 B2 | 8/2002 | Dettoni |
| D463,702 S | 10/2002 | Ku |
| 6,591,437 B1 | 7/2003 | Phillips |
| 6,604,252 B1 | 8/2003 | Lee |
| 6,612,606 B1 | 9/2003 | Bergenheim |
| D484,213 S | 12/2003 | Linder |
| D486,344 S | 2/2004 | Ku |
| D487,373 S | 3/2004 | Ku |
| D501,112 S | 1/2005 | Kasatshko |
| 6,857,142 B2 | 2/2005 | Fruge |
| D502,350 S | 3/2005 | O'Reagan |
| D507,445 S | 7/2005 | Song |
| D509,698 S | 9/2005 | Torres |
| D513,915 S | 1/2006 | Jacklin |
| 7,097,204 B2 | 8/2006 | Jessup |
| 7,246,393 B2 | 7/2007 | Westendorf et al. |
| 7,264,275 B2 | 9/2007 | Wang |
| D560,947 S | 2/2008 | Kreucher |
| D584,911 S | 1/2009 | Hisey |
| 7,845,718 B1 * | 12/2010 | Bosstick ............ B60N 2/345 297/118 |
| 7,857,370 B2 | 12/2010 | Heller |
| D634,961 S | 3/2011 | Lowery |
| 8,065,761 B2 | 11/2011 | Hanrahan |
| 8,474,079 B1 | 7/2013 | Gangitano |
| 8,656,541 B2 | 2/2014 | Muollo |
| 8,662,367 B2 | 3/2014 | Panaro |
| 9,096,150 B2 | 8/2015 | Cuddihy |
| 9,545,999 B2 | 1/2017 | Henshaw |
| 9,738,185 B1 | 8/2017 | Guygaew |
| 9,944,205 B2 * | 4/2018 | Lu .................. B60N 2/914 |
| D818,289 S | 5/2018 | Facco |
| D818,652 S | 5/2018 | Song |
| 10,099,581 B2 | 10/2018 | Hjerpe |
| D834,351 S | 11/2018 | Bosstick |
| 2002/0148046 A1 * | 10/2002 | Pirzada ............ A47C 27/18 5/713 |
| 2003/0140416 A1 | 7/2003 | Olenick |
| 2005/0087650 A1 | 4/2005 | Quan |
| 2007/0057557 A1 | 3/2007 | Moon |
| 2017/0197720 A1 * | 7/2017 | Kiraz ............ B64D 11/0647 |
| 2017/0217351 A1 | 8/2017 | Jaradi |
| 2019/0047445 A1 | 2/2019 | Kim |
| 2019/0217956 A1 | 7/2019 | Diep |
| 2020/0017219 A1 | 1/2020 | Bosstick |
| 2020/0164779 A1 | 5/2020 | Bosstick |
| 2020/0337467 A1 | 10/2020 | Cannon |

* cited by examiner

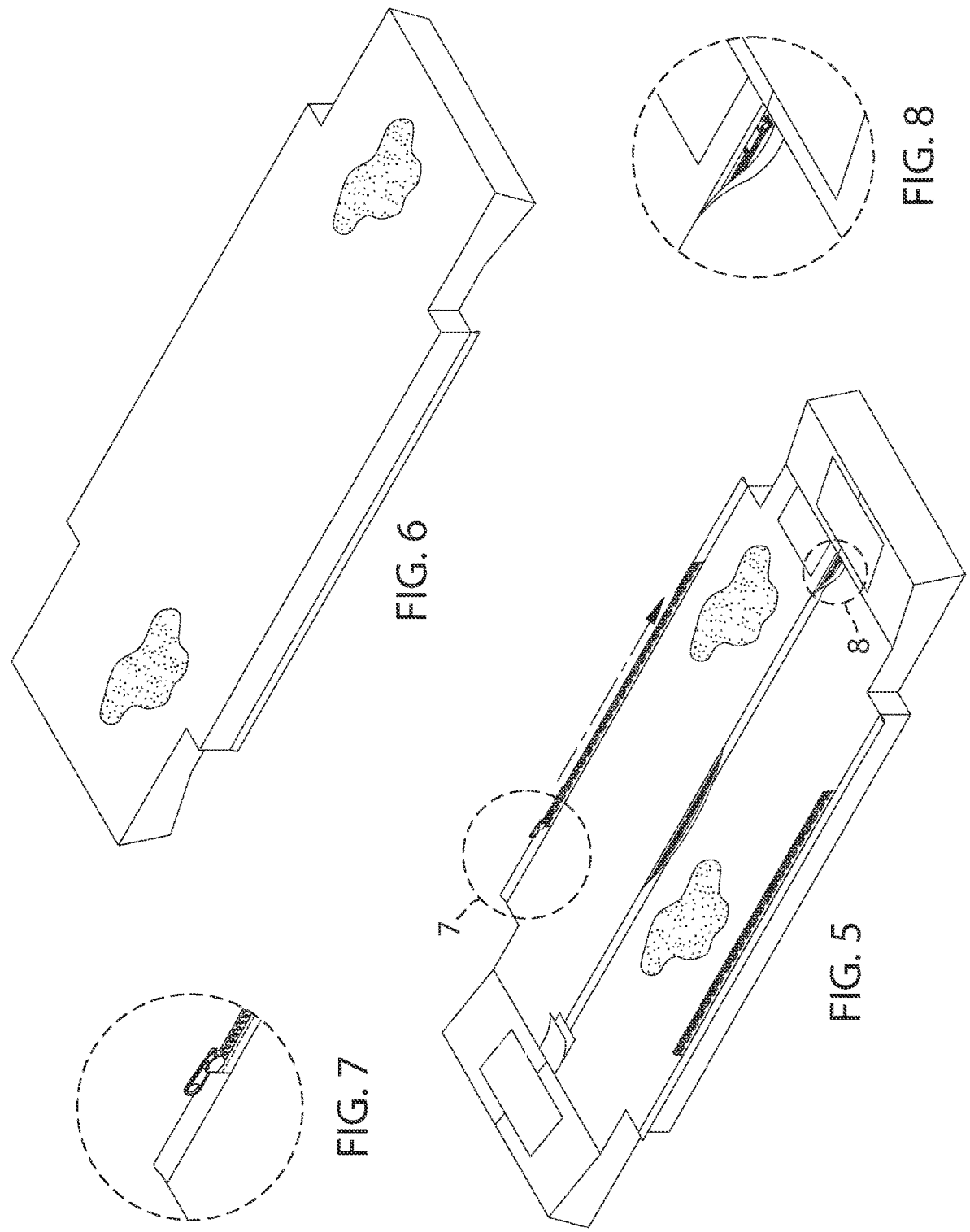

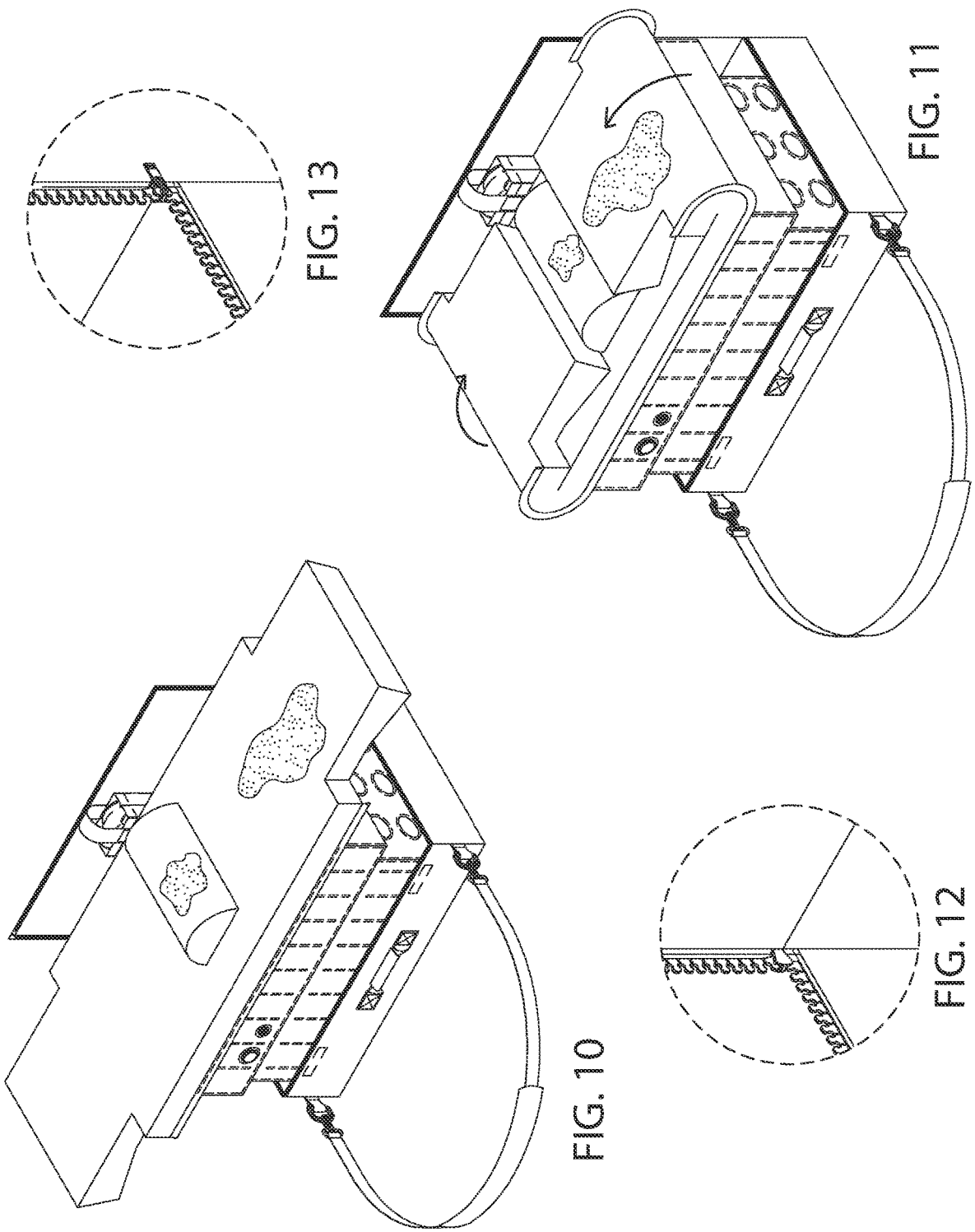

INFLATABLE BED WITH SAFETY ADAPTATIONS FOR RAPID LOSS OF AIRCRAFT CABIN PRESSURE

CROSS REFERENCE TO RELATED APPLICATIONS

This application claims the benefit of U.S. Provisional Application No. 62/979,321, filed Feb. 20, 2020, which is hereby fully incorporated by reference herein.

BACKGROUND OF THE INVENTION

Inflatable aircraft beds have been designed and constructed to provide desirable comfort and adaptability of use of cabin space within aircraft without requiring cost-prohibitive installation or other modifications to the aircraft. However, under certain conditions, an inflated structure inside an aircraft cabin can become a danger. Specifically, under rapid loss of cabin pressure, an inflated structure such as an aircraft bed can expand due to pressure differentials, and such expansion can significantly distort the dimensions of the bed. In extreme situations, this risks damage to adjacent fixtures as well as harm to passengers.

The present invention relates to bed structures having an inflatable and/or collapsible/deflatable component. More particularly, it relates to bed construction configurations that include multiple adaptations for enhanced safety in situations of rapid loss of aircraft cabin pressure to meet airflow requirements for emergency decompression events as well as to provide overall better airflow for in-cabin air filtration systems. The bed configurations include cross-welded structures and bowing-prevention stabilizers to control bulging of the bed when inflated.

SUMMARY

Some embodiments of the invention relate to a device for forming a bed surface. In some embodiments, the device can include an inflatable foundation block, including a top wall, a bottom wall, two end walls, two side walls. In some embodiments, the device can include stabilizers that run the length between the two end walls. In some embodiments, the device can include cross-welded structures in contact with an interior portion of the top and bottom and side walls. In some embodiments, the bottom wall is capable of being supported by a floor surface between two face-to-face passenger seats in a craft. In some embodiments, the end walls and side walls can rise to support the top surface. In some embodiments, the top surface can have a width about that of the face-to-face passenger seats, and the top surface can have a length from a top of one end wall to a top of another end wall and can equal about a distance between opposing front edges of the face-to-face passenger seats. In some embodiments, the entire foundation block can be adapted to be decompressed in a stowage state and expanded in an installed state. In some embodiments, the top surface of the foundation block can extend between the opposing front edges of the seat cushions of the passenger seats in the installed state, and the stabilizers can run the length of the foundation block. In some embodiments, the device can include an inflatable foundation pad including a top surface, a bottom surface, two end walls and two side walls, where the top surface can span an aisle of the craft between the face-to-face passenger seats and a second seating section. In some embodiments, the bottom surface of the inflatable foundation pad can be capable of being supported by the top surface of the foundation block, top surfaces of the two face-to-face passenger seats, and a top surface of the second seating section.

In some embodiments, the stabilizers can be hollow flexible tubes.

In some embodiments, the stabilizers can be parallel to each other.

In some embodiments, the stabilizers can be evenly spaced apart.

In some embodiments, the device can be configured to allow an open air flow between a vertical portion of the foundation block and a fixed portion of an aircraft, to facilitate flow of air between the foundation block and the fixed portion.

In some embodiments, the flow of air can include air released from the foundation block during rapid decompression of an aircraft cabin.

In some embodiments, the flow of air can include air circulated through an aircraft cabin by an air filtration system.

In some embodiments, the device can further include a pressure-control valve adapted to open at a pre-set pressure difference between air inside the foundation block and air in the aircraft cabin.

In some embodiments, the foundation block can include an upper portion and a lower portion, each portion can have a top wall, a bottom wall, and vertical walls, and the bottom wall of the upper portion can be in contact with the top wall of the bottom portion, and sealed air passages can permit flow of air between the upper portion and the lower portion to permit maintenance of equal air pressure in the upper and lower portions.

In some embodiments, a first area, occupied by the bottom wall of the lower portion, can be less than a second area, occupied by the top wall of the upper portion, and a difference between the first area and the second area can create a space for passage of air between the foundation block and a fixed structure of the aircraft.

In some embodiments, the device can be capable of decompressing to the stowage state at a rate 25% faster than an equivalent device without stabilizers.

In some embodiments, the device can be capable of expanding to the installed state at a rate 25% faster than an equivalent device without stabilizers.

BRIEF DESCRIPTION OF THE DRAWINGS

The present application is further detailed with respect to the following drawings. These figures are not intended to limit the scope of the present application, but rather, illustrate certain attributes thereof.

FIG. 5 depicts a bottom perspective of a top pad.

FIG. 6 depicts a top perspective of a top pad.

FIG. 7 depicts detail of the zipper of the top pad.

FIG. 8 depicts detail of the zipper of the top pad.

FIG. 10 depicts the top pad, the pillow, the foundation block, and the carrying case as a single unit with the top pad unfolded.

FIG. 11 depicts the depicts the top pad, the foundation block, and the carrying case as a single unit with the top pad folded, with the pillow between the ends of the top pad.

FIG. 12 depicts details of the zipper on the carrying case.

FIG. 13 depicts details of the zipper on the carrying case.

DETAILED DESCRIPTION OF THE INVENTION

Figure 2:
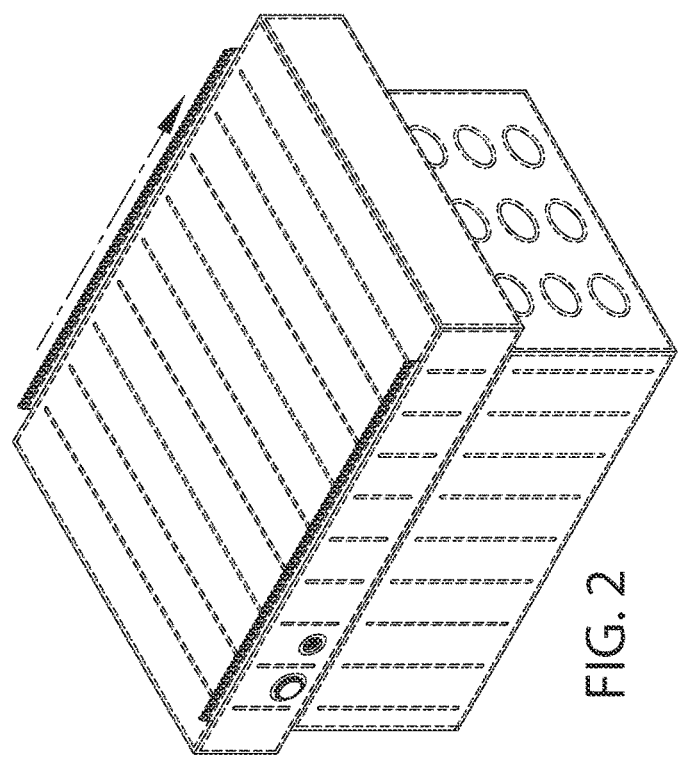
FIG. 2 depicts the foundation block as one unit.
Figure 3:
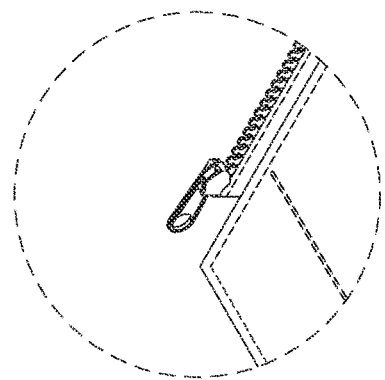
FIG. 3 depicts detail of the zipper of the foundation block.

The invention provides multiple adaptations to enhance the safety of an inflated bed under rapid loss of cabin pressure. The overall geometric dimensions of the bed are stabilized and preserved such that these dimensions do not undergo significant change even during rapid loss of cabin pressure, and that permit pressure differentials to equalize before an explosive failure can occur.

This significant improvement in safety is achieved by multiple innovations of the invention. These innovations include air passages between structural portions of the bed, sealed by internal welds, permitting equal distribution of pressure within different structural chambers. Accordingly, in many embodiments of the invention, air pressure inside the bed is substantially equally distributed among the various structural portions of the bed at all times.

In many embodiments, the platform is further stabilized against dimensional distortion under rapid loss of cabin pressure by a plurality of bowing-prevention stabilizer tubes internally welded between the walls of the platform. These tubes have a prescribed length that limits the ability of the platform walls to bow outward under a loss of cabin pressure. Any tendency to bow outward is counteracted by the fact that the length of the internal tubes cannot increase beyond specified limits. Thus, the walls of the platform cannot bow outward at any greater distance from each other than the maximum length of the internal tubes. The number and placing of the tubes and the strength of the welds can be adapted to be able to counteract essentially any expansive force applied to the inside walls of the platform during rapid loss of cabin pressure.

Likewise, platform-wall bowing along an axis perpendicular to the stabilizer tubes is prevented by cross-welded structures connecting the vertical walls of the platform that are not contacted by the ends of the stabilizer tubes. In this way, undue bowing or expansion of any portion of the platform is minimized or fully eliminated, reducing or eliminating any risk of explosion of the platform.

Any dangerously high difference in pressure between the inside of the bed and the aircraft cabin is rapidly adjusted by release of air inside the bed through one or more pressure-control valves incorporated into the structure. Under normal use of the bed and normal cabin pressures, the valve remains closed and maintains a desired internal pressure to provide desirable rigidity to the bed. However, at a higher pressure difference that would only occur with rapid loss of cabin pressure, the valve opens and releases air from the inflated device until the pressure differential comes within tolerance limits of the valve.

Yet another innovation of the invention is a negative space in the structure of the platform that leaves an air duct between the platform and a portion of the vertical (frontside) surface of seats to which the bed is adjacent. This air duct provides a channel for flow of air to permit release of air from the device via the pressure control valve and/or movement of air between the bed and the adjacent fixed seat structure to avoid displacement and/or dislodgement of the bed structure during a rapid loss of cabin pressure. In conditions of normal aircraft cabin pressure and operation, the negative space (or air duct) also permits air flow for cabin air filtration systems, such as HEPA filtration systems, whose air-flow vents are typically placed in such a way that, without the negative space, a bed platform of the prior art would block the vents and restrict airflow for the filtration process.

Figure 1:
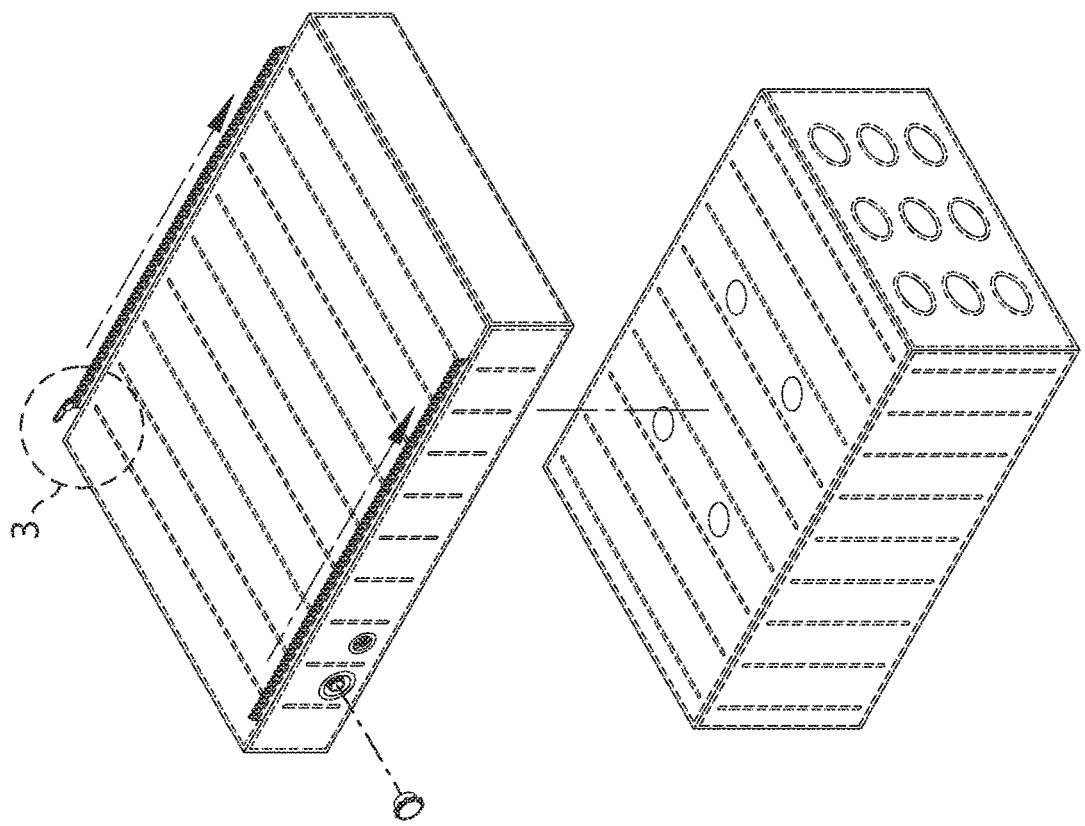
FIG. 1 depicts the two pieces of the foundation block that make up a unit, and depicts the air passages between the two pieces of the foundation block.
Figure 4:
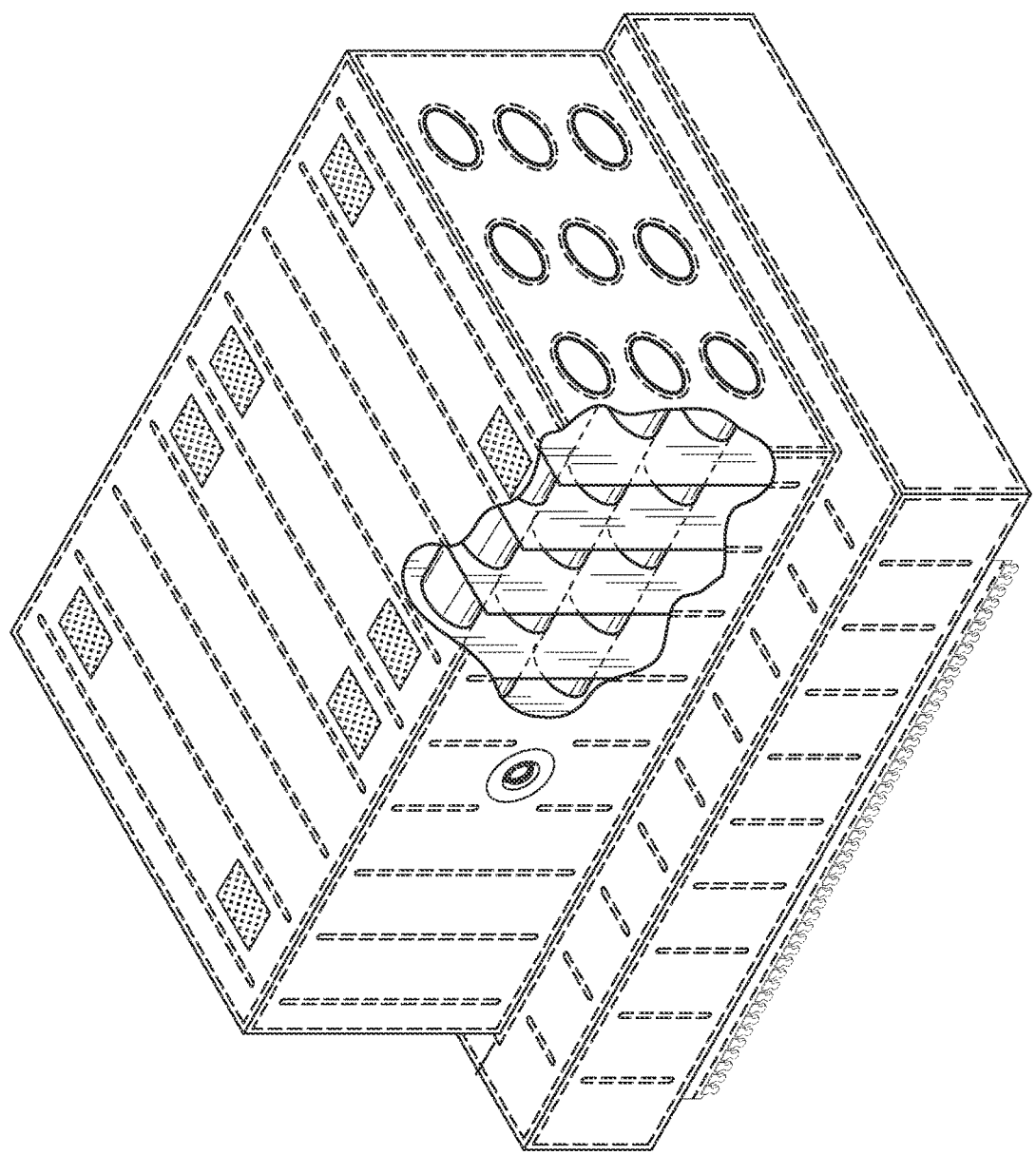
FIG. 4 depicts the bowing-prevention stabilizers in the foundation block.
Figure 9:
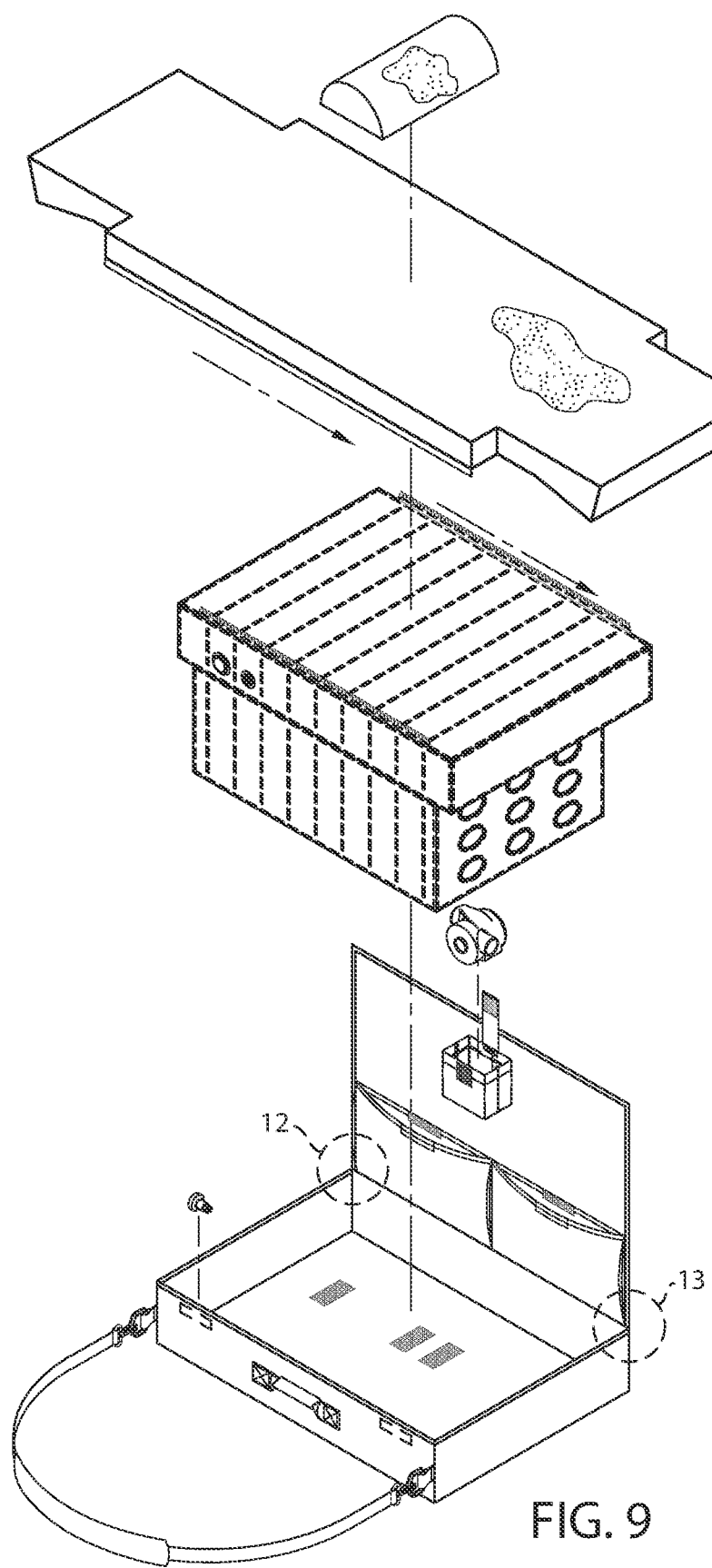
FIG. 9 depicts the top pad, the foundation block, and the carrying case as separate units.
Figure 14:
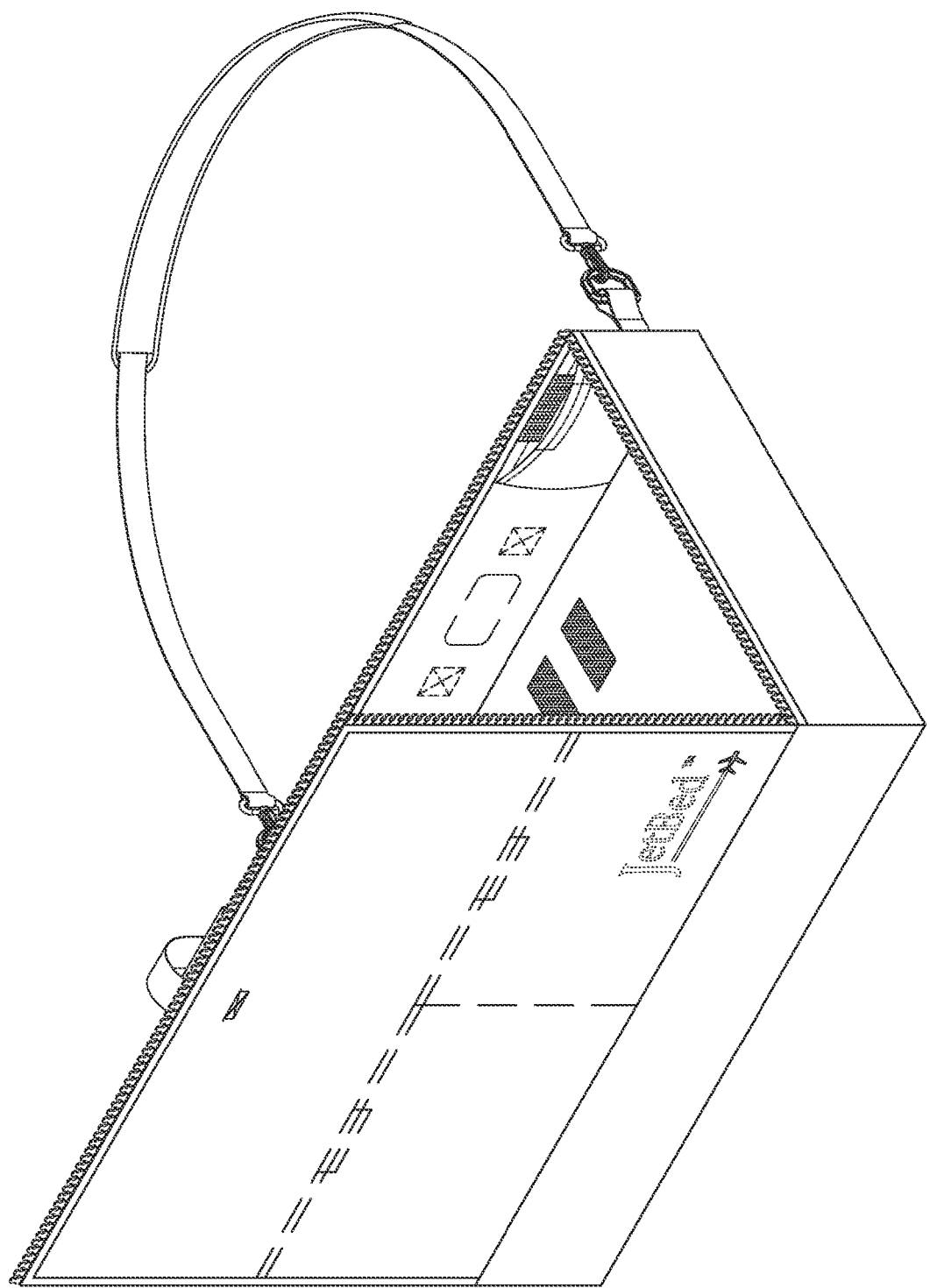
FIG. 14 depicts the carrying case.
Figure 15:
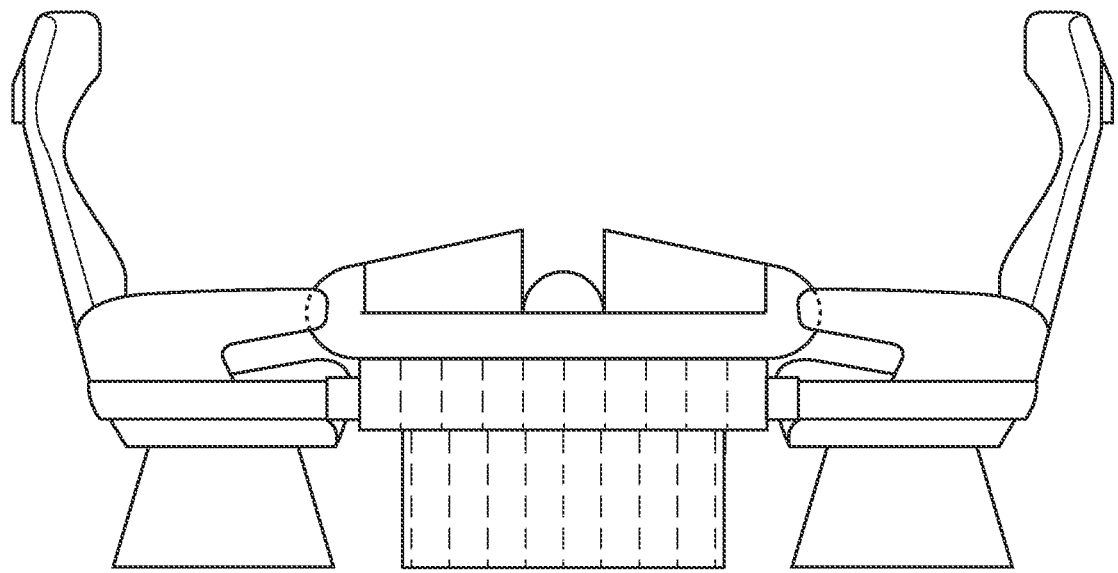
FIG. 15 depicts an embodiment of the invention used with two face-to-face passenger seats.
Figure 16:
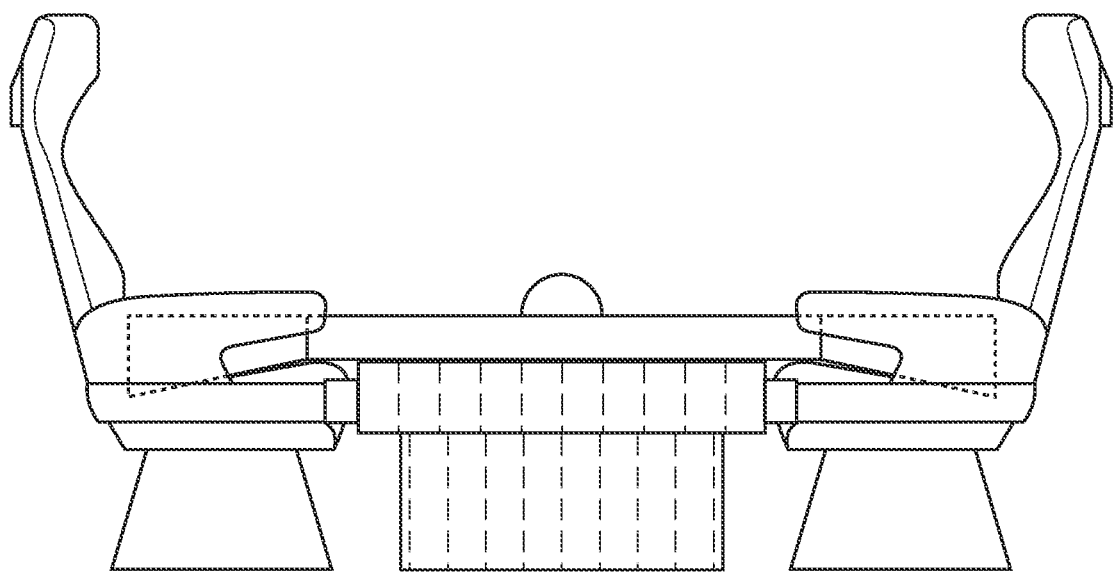
FIG. 16 depicts an embodiment of the invention used with two face-to-face passenger seats. The dotted lines depict the bed in an extended position, with the top pad on top of the facing seats.
Figure 17:
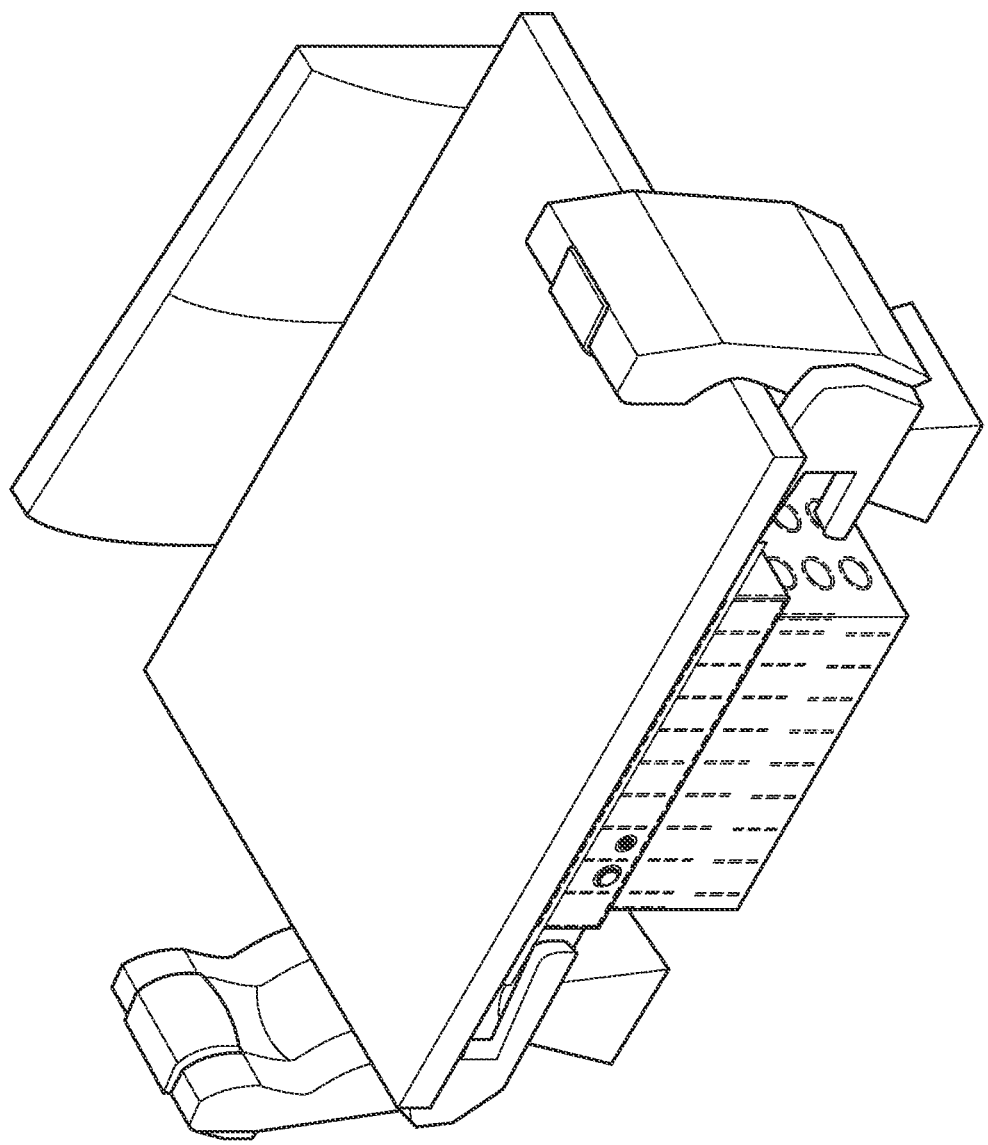
FIG. 17 depicts an embodiment of the invention used with two face-to-face passenger seats and a second seating section.

Accordingly, this disclosure provides bed configurations that include cross-welded structures (FIGS. 1, 2, etc., dotted lines) and bowing-prevention stabilizers (ends shown as multiple oval shapes in FIGS. 1 and 2, more fully depicted in FIG. 4) to control bulging of the bed when inflated and air ducts (recessed portions shown in FIGS. 2 and 4, such that the lower portion of the base has a smaller horizontal area than the upper portion) to meet airflow requirements for emergency decompression events and to provide overall better airflow.

Embodiments of the present invention provide devices which quickly and inexpensively transform passenger seating in an aircraft or other craft featuring seating sections (the aircraft, watercraft, trailers, campers, automotive vehicles, or the like, are collectively referred to herein as "transport craft" or simply "craft") into a horizontal bed surface adapted to provide users with a flat surface upon which to lie on their back, side or stomach. A collapsible foundation block is adapted to form a space filling function as to a space between passenger seats or seating sections. The foundation block is preferably inflatable and is supported from a floor surface between passenger seats or seating sections, whereafter a supporting structure of the foundation block rises to a top surface generally parallel to the floor. The elevation of the top surface is approximately a level of a top surface of seat cushions or other seat structures, of the passenger seats or seating sections.

Embodiments of the invention include devices that transform (1) two face-to-face seats into a bed surface; (2) two seating sections separated by a aisle into a bed surface, the seating sections can be any combination of face-to-face seats and bench-like seat(s); (3) a bench-like seating section into a bed surface.

A bed surface is expected by users to include a generally flat surface from head to feet which is horizontal relative to a floor. The bed surface can be a similar size to a single bed or a double bed or larger.

In one form of the bed device, the normal discontinuities and seat declinations found in almost all craft seating are eliminated. A top pad, preferably enclosed in a soft but durable fabric envelope, is attached to the entire top surface of the foundation pad, forming a relatively planar first bed surface parallel to the floor. Adjacent edges of the top pad lie substantially adjacent to an upper elevation of the seat cushions of each seat or other seating surface, i.e., at a front edge of the seat cushion. Connected by hinges or flexible hinge-like attachment to the adjacent edges are connection edges of filler pads. Filler pads are adapted to lie on the top surface of a declination type seat and substantially conform, on an underside, to the declination curvature. A second bed surface of the filler pads is a flat topside and substantially co-planar with the first bed surface. The entire bed surface upon which users can lie on their back, side or stomach consists of a first bed surface of the top pad and two second bed surfaces of the filler pads adjacent to and substantially co-planar with the top pad. The flexible or hinge connection between the top pad and the filler pads eliminates sensed discontinuities in the entire bed surface. In some embodiments, the filler pads are provided separately and are not physically connected to the rest of the bed device.

In another form of the invention, the foundation block includes a generally rectangular shape with a top wall, bottom wall, two end walls (abutting or adjacent to the fronts of the seats), and two side walls. Securing means optionally secures the foundation block to the seats or other seating surface. A form of the securing means uses the existing seat belts of the craft. The device is optionally adapted to use the existing seat belts of the craft to secure the bed surface, or the user and the bed surface to the floor of the craft. The foundation pad and/or top pad can have holes/slits adapted for use with the existing seat belts of the craft. In some embodiments, the foundation block can also be secured by the internal air pressure within the foundation block when inflated. The foundation block can be inflated so that the sides of at least a portion (such as the upper portion) of the foundation block are in firm contact with the passenger seats such that the foundation block is secured in place. Using the existing seat belts in combination with air pressure of the foundation block, it is unnecessary to fix the bottom of the foundation block to the floor in order to obtain a structure sufficiently secure to support the weight of users and thereafter remain in location. Undue side to side shifting of the foundation block is also essentially eliminated.

The foundation block can include air ducts to meet airflow requirements for emergency decompression events well as provide overall better airflow such as to permit flow through vents to advanced air filtration systems including but not limited to HEPA filtration systems. The foundation block can also include bowing-prevention stabilizers that are located parallel to each other and run the length of the foundation block as depicted in the figures. The stabilizers can be evenly spaced in such a way as to prevent undue outward bowing of the wall portions between the stabilizers, under foreseeable pressure differentials created upon rapid loss of cabin pressure. The cross-welded structures and the stabilizers prevent the foundation block from bowing outward and failing or exploding during rapid loss of cabin pressure. There can be, for example, 4, 9, 16, 25, or more stabilizers. In some embodiments, the number of stabilizers can be the square of a smaller whole number. In other embodiments the number of stabilizers is not the square of a smaller whole number but is some other whole number whose square root is not a whole number.

The foundation block can include a valve for the users to adjust air pressure of the mattress. The foundation block can also include a valve to permit escape of air inside the block when there is a positive pressure differential, of a preselected amount, on the inside of the block as compared with outside the block in the cabin of the vessel. In some embodiments, the preselected amount of the pressure differential that triggers the valve to permit escape of air is 1.5 psi. In other embodiments, the preselected amount of pressure differential is greater than 1.5 psi such as, for example 1.75, 2, 2.25, 2.5, 3.0, 3.5, 4.0, 4.5, 5 psi, or more, while in other embodiments the preselected amount of pressure differential is less than 1.5 psi such as, for example, 1.25, 1.0, or 0.75 psi, or less.

When the preselected pressure differential is reached due to cabin depressurization, the valve permits air to escape so as to avoid eventual failure of the welds and explosion of the bed, or any part of the bed. This capability enhances the safety of the bed and avoids having explosion of the bed further exacerbate the combination of other dangers that can be associated with rapid depressurization of an airplane cabin.

In some embodiments, different sections of the bed can require different internal air pressures to provide the necessary support and rigidity. Accordingly, in some embodiments of the invention, the thickness of the walls of some sections, and the strength of the construction joining different pieces of the material of which the bed is made, can be adapted and varied based upon the amount of internal air pressure that portion of the bed can be required to sustain. Likewise the placement, spacing, and number of inflatably rigid support beams can be adapted based upon the particular design and needs of the bed.

In other embodiments, air passages between the upper and lower portions of the foundation block permit equalization of air pressure within all inflated portions of the bed. In these configurations, escape of air due to opening of a pressure-control valve in one portion of the bed relieves pressure from all inflated portions of the bed.

Embodiments of the invention provide an inflatable foundation pad capable of spanning a space between two spaced apart, seating sections, such as are found on commercial jetliner or business jet aircraft, to form a relatively flat surface, including the seat surfaces of the seating sections, to form a bed surface; filler pads which can be flexibly attached to top end edges of the foundation pad that, when the foundation pad is in inflated and in place, extend onto the seat or bench surfaces to provide a more uniform bed surface from one end of the entire bed surface to the other; and a fabric covered, foam top cushion for the foundation pad top surface that is effectively continuous with the tops of the filler pads so that users experiences a uniform softness of the bed surface from one end to the other. Users can lie down securely, with or without a strap or straps about their body, for long periods of time on the bed surface. The foundation block can be deflated and other extensions from it folded into a small volume for compact storage.

One or more sections of the bed or the entire bed can be folded into a single compact carrying bag/case. The carrying bag can include a handle. The carrying bag can include a carrying/shoulder strap. The carrying/shoulder strap can be detachable.

All references, including publications, patent applications, and patents, cited herein are hereby incorporated by reference in their entirety and to the same extent as if each reference were individually and specifically indicated to be incorporated by reference and were set forth in its entirety herein (to the maximum extent permitted by law), regardless of any separately provided incorporation of particular documents made elsewhere herein.

The use of the terms "a" and "an" and "the" and similar referents in the context of describing the invention are to be construed to cover both the singular and the plural, unless otherwise indicated herein or clearly contradicted by context.

Unless otherwise stated, all exact values provided herein are representative of corresponding approximate values (e.g., all exact exemplary values provided with respect to a particular factor or measurement can be considered to also provide a corresponding approximate measurement, modified by "about," where appropriate). All provided ranges of values are intended to include the end points of the ranges, as well as values between the end points.

The description herein of any aspect or embodiment of the invention using terms such as "comprising", "having," "including," or "containing" with reference to an element or elements is intended to provide support for a similar aspect or embodiment of the invention that "consists of", "consists essentially of", or "substantially comprises" that particular element or elements, unless otherwise stated or clearly contradicted by context (e.g., a composition described herein as comprising a particular element should be understood as also describing a composition consisting of that element, unless otherwise stated or clearly contradicted by context).

All headings and sub-headings are used herein for convenience only and should not be construed as limiting the invention in any way.

The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The citation and incorporation of patent documents herein is done for convenience only and does not reflect any view of the validity, patentability, and/or enforceability of such patent documents.

This invention includes all modifications and equivalents of the subject matter recited in the claims and/or aspects appended hereto as permitted by applicable law.

Applicant reserves the right to seek design protection of any portions of the invention that are eligible for design-patent coverage, and as shown in the drawings.

What is claimed is:

1. A device for forming a bed surface comprising: (a) an inflatable foundation block, comprising a top wall, a bottom wall, two end walls, two side walls, and stabilizers that run the length between the two end walls, and cross-welded structures in contact with an interior portion of the top and bottom and side walls, wherein the bottom wall is capable of being supported by a floor surface between two face-to-face passenger seats in a craft, the end walls and side walls rise to support the top surface, the top surface has a width about that of the face-to-face passenger seats, the top surface has a length from a top of one end wall to a top of another end wall and equals about a distance between opposing front edges of the face-to-face passenger seats, and the entire foundation block is adapted to be decompressed in a stowage state and expanded in an installed state, wherein the top surface of the foundation block extends between the opposing front edges of the seat cushions of the passenger seats in the installed state, wherein the stabilizers run the length of the foundation block; and (b) an inflatable foundation pad comprising a top surface, a bottom surface, two end walls and two side walls, wherein the top surface spans an aisle of the craft between the face-to-face passenger seats and a second seating section, wherein the bottom surface of the inflatable foundation pad is capable of being supported by the top surface of the foundation block, top surfaces of the two face-to-face passenger seats, and a top surface of the second seating section, wherein the stabilizers are hollow flexible tubes that are adapted to prevent outward bowing of the side walls during inflation and under pressure differentials created upon rapid loss of cabin pressure.

2. The device of claim 1, wherein the stabilizers are parallel to each other.

3. The device of claim 1, wherein the stabilizers are evenly spaced apart.

4. The device of claim 1, configured to allow an open air flow between a vertical portion of the foundation block and a fixed portion of an aircraft, to facilitate flow of air between the foundation block and the fixed portion.

5. The device of claim 4, wherein the flow of air comprises air released from the foundation block during rapid decompression of an aircraft cabin.

6. The device of claim 4, wherein the flow of air comprises air circulated through an aircraft cabin by an air filtration system.

7. The device of claim 1, further comprising a pressure-control valve adapted to open at a pre-set pressure difference between air inside the foundation block and air in the aircraft cabin.

8. The device of claim 1, wherein the foundation block comprises an upper portion and a lower portion, each portion having a top wall, a bottom wall, and vertical walls, and wherein the bottom wall of the upper portion is in contact with the top wall of the bottom portion, and wherein sealed air passages permit flow of air between the upper portion and the lower portion to permit maintenance of equal air pressure in the upper and lower portions.

9. The device of claim 8, wherein a first area, occupied by the bottom wall of the lower portion, is less than a second area, occupied by the top wall of the upper portion, and wherein a difference between the first are and the second area creates a space for passage of air between the foundation block and a fixed structure of the aircraft.

* * * * *